United States Patent

Kamiguchi et al.

[11] Patent Number: 5,906,777
[45] Date of Patent: May 25, 1999

[54] INJECTION MOLDING CONTROL METHOD FOR AN INJECTION MOLDING MACHINE

[75] Inventors: Masao Kamiguchi, Minamitsuru-gun; Tatsuhiro Uchiyama; Yuichi Hosoya, both of Oshino-mura, all of Japan

[73] Assignee: Fanuc LTD, Yamanashi, Japan

[21] Appl. No.: 08/553,420

[22] PCT Filed: Mar. 7, 1995

[86] PCT No.: PCT/JP95/00370

§ 371 Date: Nov. 22, 1995

§ 102(e) Date: Nov. 22, 1995

[87] PCT Pub. No.: WO95/25624

PCT Pub. Date: Sep. 28, 1995

[30] Foreign Application Priority Data

Mar. 24, 1994 [JP] Japan .................................. 6-076384

[51] Int. Cl.⁶ .................................................. B29C 45/77
[52] U.S. Cl. .................... 264/40.1; 264/40.7; 425/149; 425/150; 425/152
[58] Field of Search ................................. 425/149, 150, 425/152; 264/328.7, 40.7, 40.1

[56] References Cited

U.S. PATENT DOCUMENTS

| | | | |
|---|---|---|---|
| 4,863,651 | 9/1989 | Koten | 425/149 |
| 4,882,117 | 11/1989 | Takeda et al. | 425/150 |
| 4,889,478 | 12/1989 | Sato | 425/150 |
| 5,063,008 | 11/1991 | Wenskus, Jr. et al. | |
| 5,346,657 | 9/1994 | Hara et al. | 425/149 |
| 5,391,070 | 2/1995 | Ito et al. | 425/152 |
| 5,415,817 | 5/1995 | Shiao et al. | 264/328.7 |

FOREIGN PATENT DOCUMENTS

| | | |
|---|---|---|
| 4345034 | 10/1994 | Germany . |
| 58-67430 | 4/1983 | Japan . |
| 63-115716 | 5/1988 | Japan . |
| 63-242619 | 10/1988 | Japan . |

OTHER PUBLICATIONS

English language abstract of Japanese Patent Publication No. 599–217119, published Jul. 12, 1984.

English language abstract of Japanese Patent Publication No. 05–301261, published Nov. 16, 1993.

Supervised by Shoji Seto "Injection Molding", 8th ed., Oct. 1, 1978, Plastic Age K. K. pp. 236–240.

*Primary Examiner*—Tim Heitbrink
*Attorney, Agent, or Firm*—Staas & Halsey

[57] ABSTRACT

Clamping and injection operations are executed partially in parallel by adjusting a clamping speed and an injection start timing T so that sum $\Sigma P$ of resin pressure acting on the parting plane of a mold cavity will not exceed mold clamping force F outputted at that time. An injection operation is started during the period in which the mold clamping force F is relatively low between mold touch and mold clamping completion, so that gas breathing from the mold cavity can be done easily without providing gas vent in the mold, thereby preventing resin filling failure or burning. Also, the clamping and injection operations are executed partially in parallel, so that time required for clamping and injection processes is shortened by time T' as a whole. Therefore, speeding of molding cycle can be attained.

14 Claims, 9 Drawing Sheets

MOLD CLOSING OPERATION SETTING SCREEN

|  | POSITION (mm) | SPEED (mm/s) |  |
|---|---|---|---|
| MOLD OPENING COMPLETION POSITION | 300.00 | 300 | |
| MOLD CLOSING SPEED CHANGE POSITION | 200.00 | 600 | |
| MOLD PROTECTION START POSITION | 100.00 | 400 | DELAY OF INJECTION START |
| MOLD TOUCH POSITION | 50.00 | 500 | FROM MOLD TOUCH POSITION 0.5 (s) |
| MOLD OPENING SPEED CHANGE POSITION 1 | 80.00 | 300 | |
| MOLD OPENING SPEED CHANGE POSITION 2 | 150 | 600 | |
|  |  | 400 | |

INJECTION MOLDING CONTROL METHOD FOR AN INJECTION MOLDING MACHINE

TECHNICAL FIELD

The present invention relates to an injection molding control method intended for speeding and stabilizing an injection molding cycle by controlling injection pressure in accordance with the mold clamping force and the mold clamping condition so that any excessive mold clamping force will not be applied during the injection process.

BACKGROUND ART

In an injection molding field, when mold closing operation in mold clamping process is completed, a mold clamping force durable to the entire injection processes including a hold pressure process is applied to a mold, and thereafter, a molten resin injecting operation is started. As a result, a movable side mold and a stationary side mold are kept firmly pressed against each other at the initial injection stage, so that gas breathing from a mold cavity becomes poor. This sometimes entails the hindrance to a filling operation of the molten resin or a molding failure such as a burn of the molding. Also, since it is necessary to start the injection operation after completing the mold clamping operation, the speeding of the molding cycle has been limited. Such a problem caused by the gas breathing fault can generally be solved by providing a gas vent in a mold. However, there is a dilemma as follows; if the gas vent is carelessly provided in the mold, burrs may be formed when a high holding pressure is applied to the mold, and, in the case where a wall thickness of the molding products is relatively large, a sink mark may occur unless a holding pressure is applied.

DISCLOSURE OF THE INVENTION

An object of the present invention is to provide an injection molding control method, which is capable of preventing defective molding caused by gas breathing fault, synthetically shortening time required for clamping and injection processes, and reducing the causes of burrs and sink marks of products.

To achieve the above object, according to one embodiment of the present invention, in executing mold clamping and injection operations, in a period between mold touch and clamping completion in a mold closing process, an injection start timing and a clamping speed are preset so that the sum of a resin pressure acting on parting plane of a mold cavity will not exceed clamping force outputted at the point of time at which the sum is calculated.

According to another embodiment of the present invention, in executing mold clamping and injection operations, in a period from a mold touch until a clamping completion in a mold closing process, an injection start timing and either an injection pressure or an injection speed are preset so that the sum of a resin pressure acting on a parting plane of a mold cavity will not exceed clamping force outputted at the point of time at which the sum is calculated.

Preferably, the aforesaid injection start timing is set on the basis of any of an elapsed time starting from the mold touch, feed of a movable platen, extension of a tie bar or mold clamping force.

The present invention, with the above-described constitution, enables an injection operation to be started during the period in which mold clamping force is relatively low within the period between the mold touch and the clamping completion. Therefore, even if a gas vent is not provided in a mold, gas can be released easily from a mold cavity, so that the failure of resin filling or burning can be prevented. Also, the clamping and injection operations are carried out overlapping with each other, so that time required for clamping and injection processes can synthetically be shortened; as a consequence, a molding cycle can be performed at a higher speed. Moreover, there is no need of providing a gas vent in a mold, and the molds are firmly pressed against each other after the completion of the clamping, so that no resin leakage occurs, thereby preventing sink mark from forming in the portions of products with large wall thickness by applying a high holding pressure to the resin.

BEST MODE FOR CARRYING OUT THE INVENTION

Figure 1:
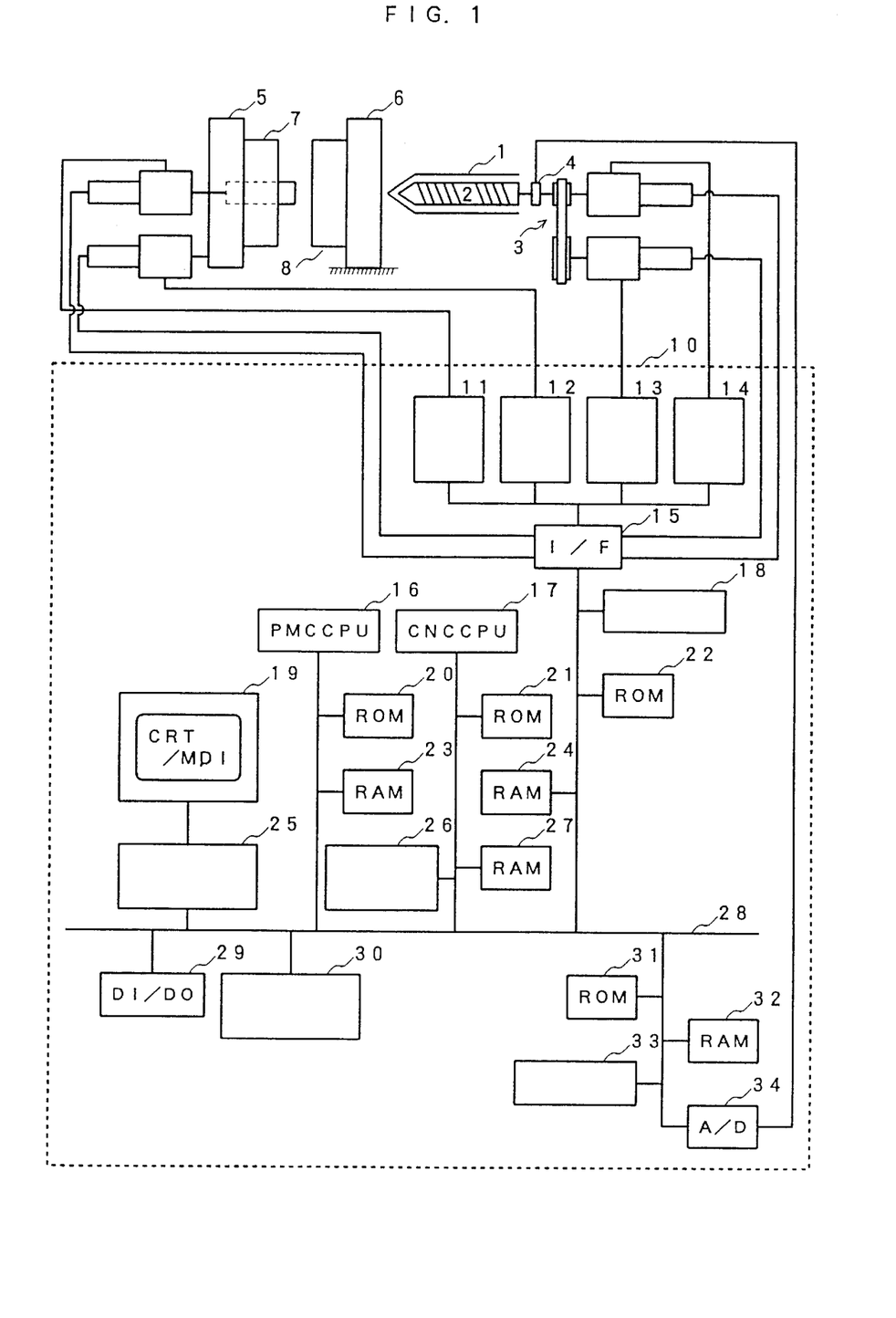
FIG. 1 is a block diagram showing main parts of an electric injection molding machine according to one embodiment to which an injection molding control method of the present invention is applied.

FIG. 1 is a block diagram showing main parts of a toggle-type electric injection molding machine according to one embodiment to which an injection molding control method of the present invention is applied. A reference numeral 1 denotes an injection cylinder of an injection molding machine, and a reference numeral 2 denotes a screw. The screw 2 is driven in the injection axis direction by means of an injection servo motor Ms. Also, the screw is rotated for metering by means of a screw servo motor Mr through a power transmission mechanism comprising a timing belt and a toothed pulley, etc. A proximal portion of the screw 2 is provided with a pressure detector 4 for detecting a resin reactive force acting on the axial direction of screw 2. The detector detects an injection pressure and holding pressure in an injection and hold-pressure process, and a back pressure of screw in a metering-kneading process, etc. Moreover, the injection servo motor Ms is provided with a pulse coder Ps for detecting a position and a feed speed of the screw 2; on the other hand, the screw servo motor Mr is provided with a pulse coder Pr for detecting a rotational speed of the screw 2.

A front platen 6 equipped with a stationary side mold 8 is fixed on a base of the injection molding machine. A movable platen 5 equipped with a movable side mold 7 is movable by a drive of a clamping servo motor Mc. The clamping servo motor Mc is provided with a pulse coder Pc for detecting a position and a feed speed of the platen 5. Incidentally, the feed of platen 5 will be described in detail with reference to FIG. 9.

Figure 9:
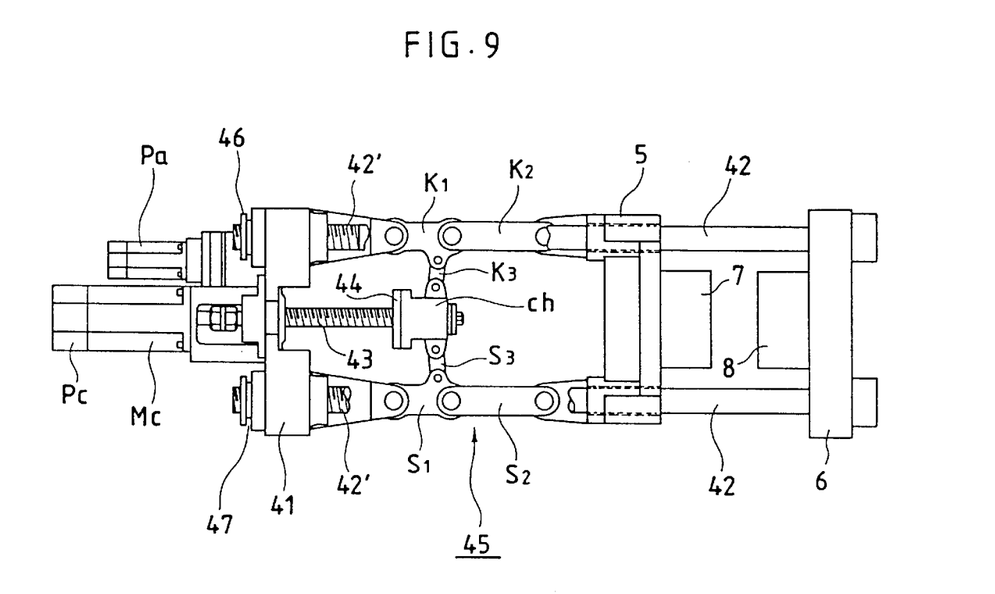
FIG. 9 is an explanatory view of a mold clamping mechanism in the injection molding machine.

In FIG. 9, like reference numerals are used to designate like members having the same functions as those in FIG. 1. In FIG. 9, a reference numeral 41 denotes a rear platen, 42 denotes a tie bar, 43 denotes a ball screw, and 44 denotes a ball nut. The ball screw 43 and the ball nut 44 constitute a ball screw mechanism.

A reference numeral 45 denotes a toggle system which is composed of links K1, K2, K3, links S1, S2, S3, and a cross head ch. The cross head ch is integrated with the ball nut 44. Thus, when the ball screw 43 is driven in the forward rotational direction by means of the clamping servo motor Mc, the cross head ch moves in the direction for leaving the rear platen 41.

Position control for the movable platen 5 is executed by the same method as conventional one, that is, based on the position of the cross head in the toggle mechanism or the amount of rotation of the clamping servo motor Mc. Movement of the cross head ch enables the train of links K1 and K2 and the train of links S1 and S2 of the toggle system 45 to be almost straightened respectively (to the lockup position), as shown in FIG. 9, from the state in which they are bent inward respectively at their joints. Incidentally, in FIG. 9, movable side mold 7 and stationary side mold 8 are not illustrated as being contact with each other; however, this is for the convenience of explanation, so that these molds 7 and 8 are actually in contact with each other.

A motor Pa for adapting to mold height thickness drives simultaneously a plurality of nuts 46, each having a pulley 47 mounted on one end of the rear platen 41, through a timing belt etc., to move the rear platen 41 along the tie bar 42. One end of the tie bar 42 on the rear platen side is formed with a thread 42' engaging with the nut 46 to move the rear platen. Thus, the distance between the front platen and the rear platen 41 can be adjusted by controlling the motor Pa. By adjusting this distance, mold clamping and opening operations are performed at an optimum position in accordance with the height of the movable side mold 7 mounted on the movable platen 5 and that of the stationary side mold 8 mounted on the front platen 6. More specifically, a power transmission mechanism, such as a timing belt for simultaneously transmitting rotational force of these nuts 46 and motor Pa to these tie bars, constitutes a mold height adjustment mechanism.

Figure 5:
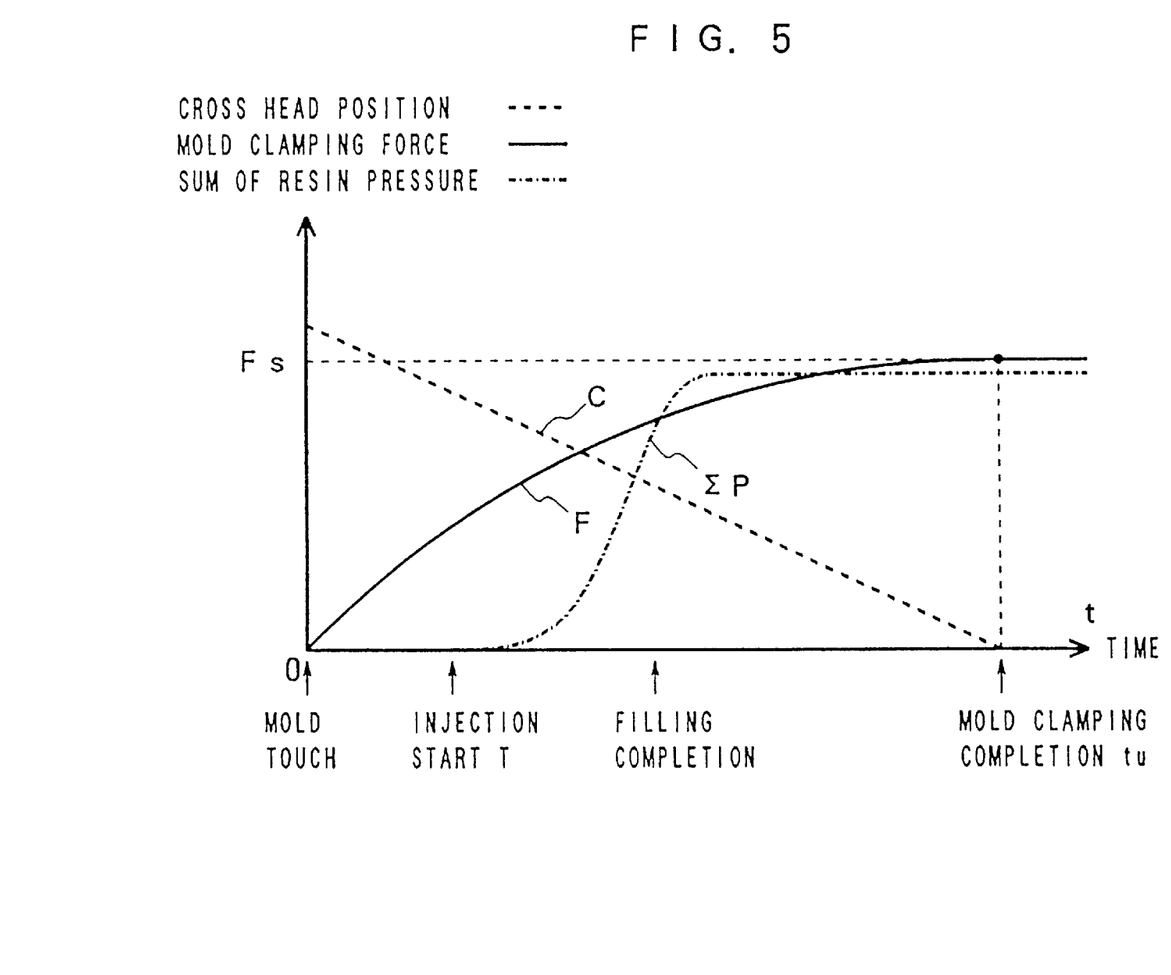
FIG. 5 is a conceptual view showing the content of display on the timing setting screen in the injection molding machine according to the embodiment.

FIG. 5 is a diagram graphically showing the relationship between a cross head position C and a clamping force F in the section ranging from the mold touch position at which the movable side mold 7 and the stationary side mold 8 are brought into contact to the clamping completion position at which the toggle mechanism is locked up by the effect of the rotation of the clamping servo motor Mc. The position C of the cross head ch driven by the clamping servo motor Mc through the ball screw mechanism linearly changes with the amount of the rotation of clamping servo motor Mc. Therefore, if the clamping servo motor Mc is rotated at a constant speed for a period from the mold touch to the lockup, the cross head position C linearly changes in proportion to time elapsed from the mold touch, as shown in the graph of FIG. 5.

On the other hand, the clamping force F nonlinearly changes according to a change in the cross head position C. This does not mean that, due to the structure of the toggle system 45, the amount of movement (i.e., increment of the clamping force F) of the movable platen 5 with respect to a unit feed of cross head ch., will remain constant regardless of the position of the cross head ch, but means that it gradually decreases as the toggle system 45 approaches its lockup state from the mold touch position. More specifically, even if the cross head ch moves at a uniform velocity, an instantaneous speed of the movable platen 5 is gradually reduced as a time elapses; for this reason, the clamping force F is represented by a gentle curve, as shown in FIG. 5.

In FIG. 5, graphically the movement of the cross head position C is represented by a straight line lowering towards the right. This is because the cross head position C at the time of the completion of the lockup is regarded as zero, and the moving direction of the cross head ch separating from the fixed platen 6 is regarded as a positive movement direction. In fact, a decrease (negative direction movement) in the cross head position indicates an increase in movement of the cross head ch on the basis of the rear platen 41, that is, the movement in clamping direction.

A preset clamping force Fs shown in FIG. 5 is a value of the clamping force F at the time tu when a clamping operation by the movement of cross head ch is completed, and the toggle system 45 and the tie bar 42 extend to their full length. The previously described mold height adjustment mechanism adjusts a mold clamping force F when the toggle mechanism 45 is in a lockup state, by varying a position of the rear platen 41 in accordance with the height of the movable side mold 7 and that of stationary side mold 8 and a desired clamping force Fs.

Also, the movable platen 5 is provided with an ejector servo motor Me for ejecting an ejector pin into the cavity of movable side mold 7, as shown in FIG. 1. The servo motor Me is provided with a pulse coder Pe for detecting a position and a feed speed of the movable platen, like the case of the aforesaid servo motor for each axis.

A control device 10 for an injection molding machine comprises a CNCCPU 17 which is a microprocessor for numerical control, a PMCCPU 16 which is a microprocessor for programmable controller, a servo CPU 18, which is a microprocessor for servo control, and a monitor CPU 33 for executing sampling processing of an injection pressure and holding pressure and a back pressure of screw, allowing the interchange of information among the respective microprocessors by mutually selecting their input and output data through a bus 28.

Connected to the PMCCPU 16 are a ROM 20, which stores sequence programs for controlling a sequential operation of injection molding machine, and a RAM 23 which is used for temporarily storing operational data. Also, connected to the CNCCPU 17 are a ROM 21, which stores programs for controlling each axis of the injection molding machine, and a RAM 27, which is used for temporarily storing operational data. A nonvolatile memory 26 (RAM) connected to the CNCCPU 17 is used as a memory for storing molding data such as molding conditions relating to an injection molding operation, various preset values, parameters, macro variables, etc, and can be accessed from other CPUs.

Connected to the servo CPU 18 are a ROM 22 which stores control programs exclusively for servo control and a RAM 24 which is used for temporarily storing operational data. Further, servo amplifiers 11 to 14 are connected to the servo CPU 18 through a servo interface 15 to drive servo motors for ejection, clamping, screw rotation and injection axes on the basis of a command from the servo CPU 18. Also, respective outputs from pulse coders Pe to Ps installed on the respective axes of servo motors are fed back to the servo CPU 18 through the servo interface 15. Ejection position of the ejector pin, position and moving speed of crosshead and a current position, moving speed and a rotational speed of the screw 2 are calculated by the servo motor CPU 18 based on the pulse fed back from each pulse coder. These data are stored in current position register and current speed storage register in the RAM 24 respectively.

Connected to the monitor CPU 33 are a ROM 31 which stores control programs relating to sampling processing for obtaining pressure data and a RAM 32 which is used for temporarily storing the data.

An input/output circuit 29 is an input/output interface for receiving signals from a limit switch and an operator control panel, which are provided in each section of the injection molding machine, and for transmitting various commands to peripheral devices of the machine, etc. Also, a communication interface 30 is an input/output interface for performing a data transmission between the host computer and cell controllers. A manual data input unit 19 with a display is connected to the bus 28 through a CRT display circuit 25, is used for selecting a monitor screen and a function menu, input operations of various data, etc., and is provided with a ten key for inputting numerical data, various function keys, etc.

With the constitution described above, the CNCCPU 17 distributes pulse to each axis servo motor on the basis of control programs and various preset values from the ROM 21. The servo CPU 18 executes servo control such as position loop control, speed loop control and current loop control, which are so-called digital servo processing, on the bases of a movement command distributed to each axis and position and speed feedback signals detected by detectors such as pulse coders Pe to Ps, in the same manner as in the case of the conventional system.

The monitor CPU 33 is a CPU of conventional type having a sampling processing function. When executing the molding operation, the CPU 33 causes the RAM 32 to update and store the change in an injection pressure and holding pressure in an injection process and hold-pressure process for each molding cycle, on the bases of the time elapsed after the start of injection and the sampling data inputted from the pressure detector 4 through an A/D converter 34.

A mold opening force acting on the movable side mold 7 at the injection start time, that is, the sum $\Sigma P$ of resin pressures acting on the parting plane of mold cavity, can be calculated by multiplying sampling data ($Kg/cm^2$) of an ideal injection pressure and holding pressure with which a conforming article is obtained by the entire project area ($cm^2$) of the cavity of movable side mold 7.

It is difficult to calculate a mold opening force $\Sigma P$ based on the data obtained from sampling processing by the pressure detector 4 arranged on the proximal portion of screw 2 or the pressure sensor arranged in the cavity before a resin is completely filled into a mold cavity, because it is impossible to previously know a cavity area on which a resin pressure acts. However, considering that a project area of a runner portion into which a resin is first filled is small, air can be compressed readily, and rise of surge pressure occurring when a resin passes through a gate is instantaneous, and so there is no problem even if a mold opening force $\Sigma P$ during the period from the start of injection to the resin filling completion, is regarded as zero. Also, to be on the safe side, assuming that an injection pressure is applied to the entire project area of the mold cavity from the injection start time, the mold opening force which acts before a resin is fully filled into the mold cavity may be estimated by calculating the sum $\Sigma P$ of the resin pressures according to the previously described method. Moreover, if there is no adverse effect on mold structure, a cavity pressure sensor is installed on a portion of the cavity where a resin is filled last so that the mold opening force $\Sigma P$ may be calculated by multiplying a cavity pressure monitored by the sensor by the entire project area of the cavity.

In FIG. 5, there is shown an example of the relationship between an elapsed time after the injection start and the mold opening force $\Sigma P$. The mold opening force $\Sigma P$ data thus prepared is registered and stored in a file of the nonvolatile memory 26. Time required from the injection start until the resin filling completion can be calculated based on an injection speed (mm/s), a screw cross section ($cm^2$) and cavity capacity ($cm^3$), which are set as molding conditions. In the case where a mold opening force $\Sigma P$ until a resin filling completion is treated as zero, the mold opening force $\Sigma P$ until the resin filling starts is set as zero; however, the mold opening force $\Sigma P$ after that represents a generally precise value.

If a gate seal in an injection process is completed, it is impossible to obtain the sum $\Sigma P$ of resin pressures acting on a parting plane from sampling data obtained by the pressure detector 4 and the like installed on the proximal portion of the screw 2, like the case of the mold opening force $\Sigma P$ before the filling completion. However, according to the injection molding control method of the present invention, an operation in the initial injection stage is carried out in parallel with a clamping operation; therefore, no problem arises in this respect.

If there is need of precisely detecting mold opening force $\Sigma P$ in all the processes including the initial stage of injection, an exclusive pressure detector for mold opening force, such as a load cell, may be interposed between the movable side mold 7 and the movable platen 5 or between the toggle system 45 and the movable platen 5. In this case, the mold opening force acting on the movable side mold 7 during injection is updated and stored in the RAM 32 in every one molding cycle based on an elapsed time after the injection start as a reference, finally, change in the mold opening force $\Sigma P$ to act in the case where conforming product is obtained is recorded in a file of the nonvolatile memory 26. In the case where a mold opening force actually acting in this manner is to be detected, there is need of subtracting a preset clamping force from a force detected by the pressure detector such as a load cell, and storing the obtained value as a mold opening force.

The method for setting an injection start timing in the present embodiment will be described in the following. In setting an injection start timing, a clamping speed, etc., an operator properly determines an injection start timing based on a time elapsed from a mold touch, and a clamping speed based on a feed speed of the cross head ch. Thereafter, the operator selects a timing setting screen by using a manual data input device 19 with a display.

The PMCCPU 16 successively reads a set of data relating to elapsed time after the injection start and a mold clamping force $\Sigma P$ from the file of nonvolatile memory 26 so that the temporarily set injection start timing coincides with an elapsed time "zero" after the injection start. In FIG. 5, there is shown a graph with an abscissa representing time values and an ordinate representing values of mold opening force, which graphically shows the relationship between a time elapsed from a mold touch and a mold opening force ΣP. For example, if the temporarily set time of the injection start timing is given as T, data indicating a mold opening force ΣP=0 and corresponding to the elapsed time "zero" after the injection start in the file, is displayed on the point (T, ΣP0) in the coordinate of FIG. 5. Also, in the file, the data indicating a mold opening force ΣP0 corresponding to the elapsed time ΔT after the injection start, is displayed on the point (T+ΔT, ΣPΔT) in the coordinate of FIG. 5. In the case where the mold opening force ΣP from the injection start until a resin filling completion is treated as zero, the mold opening force ΣP takes zero value during the period from the injection to the resin filling completion; for this reason, data during this-period is not substantially displayed. However, data initially displayed, that is, a plotted position of the mold opening force at the filling completion time includes an offset corresponding to the time required for filling with respect to the temporarily set injection start timing; therefore, graphically plotted positions of the mold opening force as the whole is almost the same as an example shown in FIG. 5.

The PMCCPU 16, after displaying the relationship between an time elapsed from a mold touch and a mold opening force ΣP, subsequently executes the following operations in the order of (1) to (3).

(1) The PMCCPU 16 calculates a function determining the relationship between time t elapsed from a mold touch and a cross head position C on the bases of a temporarily set clamping speed and cross head position data corresponding to a mold touch position.

(2) Next, by taking advantage of a known operation expression such as disclosed in Japanese Patent Application Laid-open No. 62-160219 for detecting a position of the movable platen 5 on the basis of the position C (feed) of cross head ch, the PMCCPU 16 calculates a position of the movable platen 5 with respect to the mold touch point as a zero, that is, an extension of the tie bar 42, on the basis of the position C of cross head ch at each point of time divided by an appropriate interval.

(3) Moreover, the PMCCPU 16 calculates a clamping force F by multiplying the extension of the tie bar 42 by a predetermined coefficient. The relationship between the time elapsed from the mold touch and the mold clamping force F, graphically represented by connecting various sets of data representing the relationship between the time elapsed from the mold touch and the mold clamping force with a free curve, is shown on the coordinates with the axis of abscissa representing the time t and the axis of ordinate representing the mold clamping force F as in FIG. 5. In this coordinate system, the same system as applied to the mold opening force is applied, and also the same scales are applied with respect to the time and force.

In FIG. 5, in the linear graph representing the cross head position C corresponding to time elapsed from a mold touch, an intercept of the ordinate represents a cross head position corresponding to a mold touch position. The inclination (distance/time) of the straight line corresponds to a temporarily set moving speed of cross head ch. When the cross head position C becomes zero by distance, a lockup of the toggle system 45, that is, mold clamping is completed. The mold touch position is previously determined in a step for adjusting a wall thickness according to the relationship between a desired mold clamping force Fs and a mold thickness. Thus, the PMCCPU 16, received temporarily set clamping speed, can display a line indicating the cross head position C in the graph.

Then, with reference to the graph shown in FIG. 5, the operator visually confirms whether or not the line representing the relationship between time t elapsed from a mold touch (t=0) and a mold opening force ΣP is always lying below the line representing the relationship between the time elapsed t from a mold touch and a mold clamping force F. If the condition that ΣP<F is satisfied, the mold opening force will not exceed the mold clamping force in a mold clamping process, and so at least undesired mold opening and the formation of the burr following the injection can surely be prevented.

Also, graphically, if a mold opening force ΣP is lying considerably below a mold clamping force F like the case shown in FIG. 7, it can be assured that undesirable opening of the mold and the formation of burr will not occur even when an injection operation is started at a time earlier than the previously and temporarily set injection start timing. In this case, therefore, the operator newly sets a temporary injection start timing which is earlier than that of the current injection start timing so that the PMCCPU 16 executes the aforesaid processing accordingly. As described before, with reference to a display screen, the operator judges whether or not the timing is suitably set, that is, a line representing a mold opening force ΣP is always lying below a line representing a mold clamping force F.

As long as a problem such as undesired mold opening and formation of the burr will not arise, there will be no substantial influence on molding conditions even if an injection start timing is set earlier. Thus, in order to execute a molding cycle at a high speed, it is preferable to set an injection start timing as early as possible within a range where the foregoing condition can be satisfied, and to elongate a period (an interval T' shown in FIG. 7) as much as possible in which the clamping and injection operations are simultaneously executed, thereby shortening a total time required for mold clamping and injection processes.

However, as shown in FIG. 5, in a state in which the line representing the mold opening force ΣP is at least partially lying above the line representing the mold clamping force F, the mold opening force exceeds the mold clamping force in a clamping process; for this reason, undesired mold opening or the formation of burr is anticipated. Therefore, there is a need of properly adjusting either injection start timing or mold clamping speed, or both so as to satisfy the previously described conditions.

Figure 6:
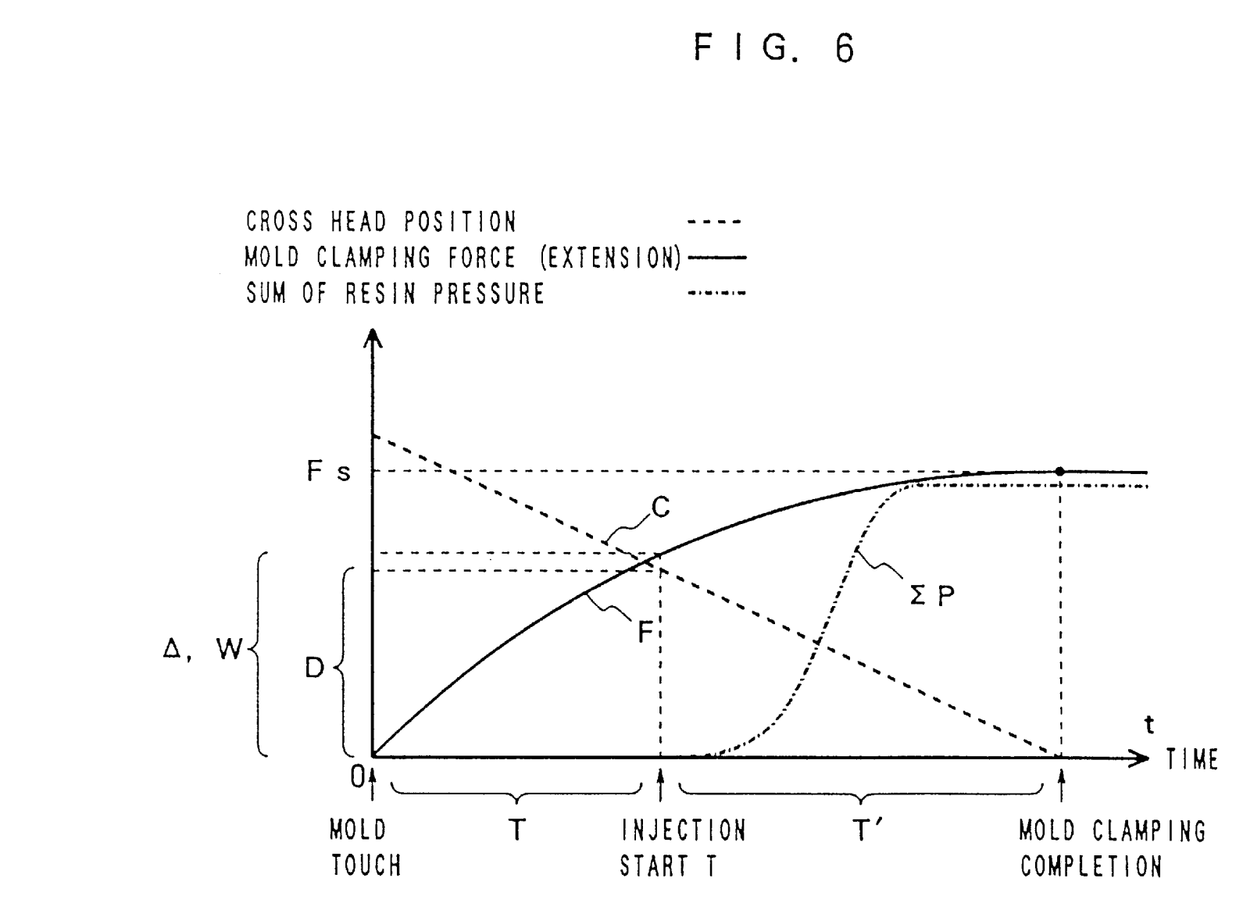
FIG. 6 is a conceptual view showing display elements on the timing setting screen in the injection molding machine according to the embodiment.

In view of stable molding operation, mold safety, etc., the most preferable adjustment method is a method of delaying only injection start timing. For example, if the injection start timing shown in FIG. 5 is delayed to the point of time shown in FIG. 6, the line representing mold opening force ΣP will be shifted towards the right along the time axis, and enters a state as shown in FIG. 6. As a result, it will be understood that the foregoing conditions are satisfied without varying mold clamping speed relating to mold safety and molding conditions such as an injection speed and injection pressure.

As the methods for setting injection start timing, besides the one in which an injection start timing is set directly based on time elapsed after a mold contact as described previously, there are one designating an injection start timing on the basis of a feed of the movable platen 5 (actually, a feed of the corresponding cross head ch), one designating an injection start timing on the basis of an extension of the tie bar 42, and one designating an injection start timing on the basis of a mold clamping force F. However, these methods are used for setting a mold opening force $\Sigma P$ so that it will not exceed a mold clamping force F in a simultaneous processes of clamping and injection operations. Finally, whether or not the foregoing conditions are satisfied is dependent on the extent to which a line representing the transition of the mold opening force $\Sigma P$ is shifted along the time axis. In other words, under a certain injection molding conditions, feed of movable platen, extension of tie bar 42 and mold clamping force F are dependent on the time t elapsed from the mold touch.

For instance, where it is desired to get an injection started when time elapsed from mold touch becomes T as shown in FIG. 6, an injection can be started at the same timing T in all the cases where the cross head position C is successively detected in a mold clamping process, and the injection is started when the cross head position C decreases to a preset value D, where the injection started when an extension of tie bar 42 detected by the strain gage mounted thereon reaches a value $\Delta$, and where the injection is started when a clamping force F detected by the load cell interposed between the movable side mold 7 and the movable platen 5 or between the toggle system 45 and the movable platen 5 reaches a preset value W.

After adjusting injection start timing, the operator provisionally sets an injection start timing so that the PMCCPU 16 executes the foregoing processing, and judges whether or not the timing is suitably set with reference to the display screen as described before. Even if the provisional injection start timing shown in FIG. 5 is set so as to be delayed until a timing shown in FIG. 6, time T' shown in FIG. 6 can be saved for each injection process compared with a conventional method of starting an injection operation after a clamping operation is fully finished. A method for adjusting only injection start timing without varying mold clamping speed is effective for synthetically shortening time required for mold clamping and injection processes, as well as for mold safety or stable molding.

Also, in view of mold safety, it is not preferable to carelessly increase mold clamping speed to a high speed; however, there is a method capable of satisfying the foregoing conditions by adjusting only mold clamping speed without adjusting injection start timing. Of course, even in the case of the conventional method of starting an injection operation after completing a mold clamping operation increasing mold clamping speed naturally brings an effect of synthetically shortening the time required for mold clamping and injection processes. However, in the present embodiment, mold clamping and injection operations are simultaneously executed; therefore, the present embodiment is more effective in synthetically shortening a required time, compared with the conventional method of merely increasing mold clamping speed to a higher speed.

If the mold clamping speed is set to a higher speed, the rise of a graphic line representing mold clamping force F becomes steeper, so that it becomes possible to bring an injection start timing nearer to the time point of mold touch by taking advantage of the aforesaid time setting method. As long as there is no problem as to the mold safety, the synthetically required time for mold clamping and injection processes can be shortened considerably.

Figure 7:
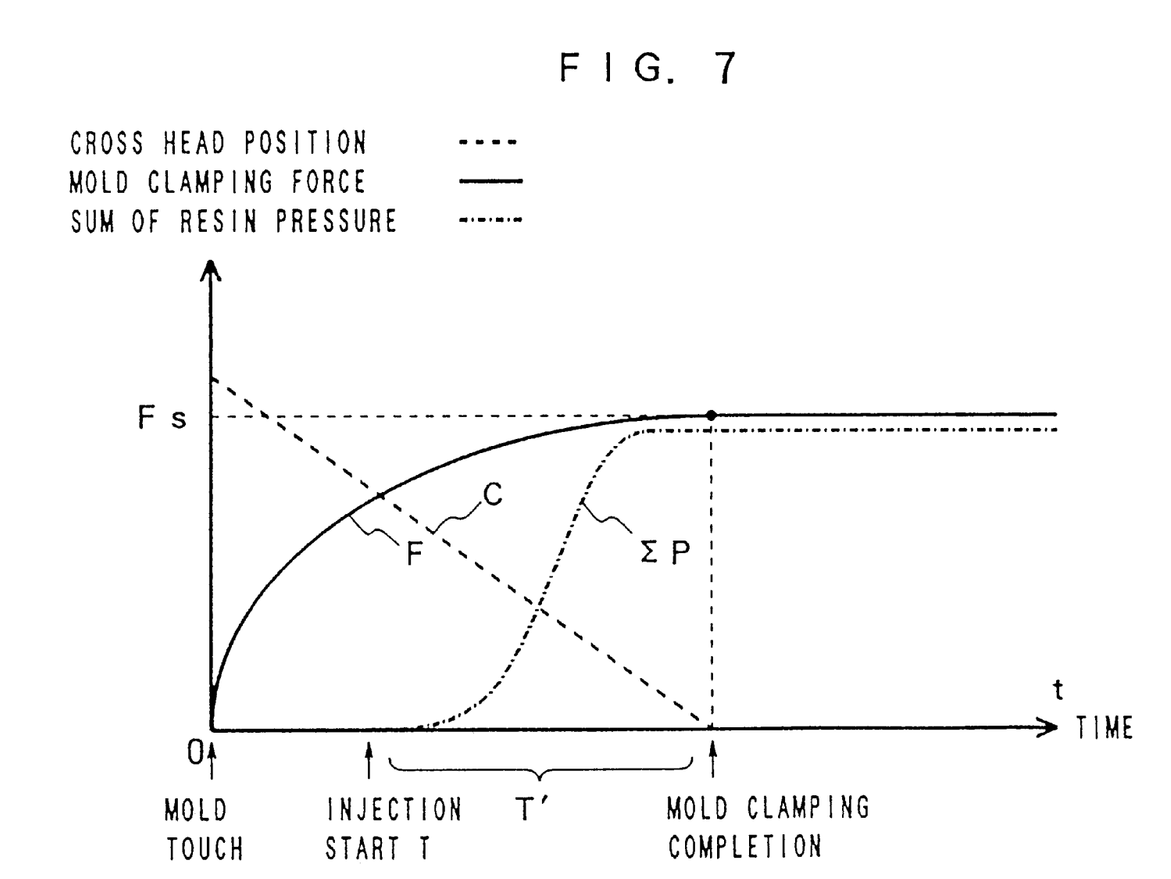
FIG. 7 is a conceptual view showing display elements on the timing setting screen in the injection molding machine according to the embodiment.

We can see that, if the transition of mold opening force $\Sigma P$ is set to the same condition as that of FIG. 5, and an injection operation is executed at the same injection pressure, time can be shortened to a much greater extent as in an example shown in FIG. 7 in which a clamping speed is increased to a higher speed, compared with the example shown in FIG. 6 in which the aforesaid conditions are satisfied by modifying only injection start timing T (t=T). If the example shown in FIG. 5 is regarded as a reference, it is possible to satisfy the aforesaid conditions only by resetting a clamping speed as shown in the example of FIG. 7. However, as already described, as long as being free from a problem such as undesired mold opening and the formation burr, there will be no substantial effect on the molding conditions no matter how much an injection start timing is advanced. Thus, in order to perform a molding cycle at a higher speed, an injection start timing should be brought nearer to the time point of mold touch as much as possible.

The method for satisfying the aforesaid conditions by adjusting mold clamping speed is particularly effective for synthetically shortening time required for mold clamping and injection processes and for stable molding. Also, there will be no other disadvantage even if the method by adjusting an injection start timing is combined with the above method.

When the clamping speed or both the mold clamping speed and injection start timing has or have been adjusted, the operator provisionally sets the mold clamping speed and the injection start timing again to let the PMCCPU 16 execute the foregoing processing. Then the operator newly judges whether or not the preset timing is properly set, that is, whether or not the foregoing conditions are satisfied, with reference to a display on the screen as described before.

If it becomes possible to obtain conforming products by lowering the injection pressure at the initial stage, when injection conditions are being sought, then appropriate injection conditions should be obtained by imposing a restriction on an injection speed and by lowering injection pressure. If the injection pressure is lowered, time required for filling resin inevitably becomes longer. However, the rate of change in a mold opening force $\Sigma P$ decreases, so that an injection start timing can be set nearer to the time point of mold touch. As a result, an overlapping operation time T' of clamping and injection becomes longer; therefore, time required for clamping and injection processes can synthetically be shortened. For example, if the transition rate of mold opening force $\Sigma P$ in the initial injection stage can be lowered from that shown in FIG. 5 to that shown in FIG. 8, a mold opening force will not exceed a mold clamping force in a mold clamping process even if an injection is started at the injection start timing shown in FIGS. 5 and 8. Therefore, at least, undesirable mold opening and formation of burr by injection can be prevented.

Figure 8:
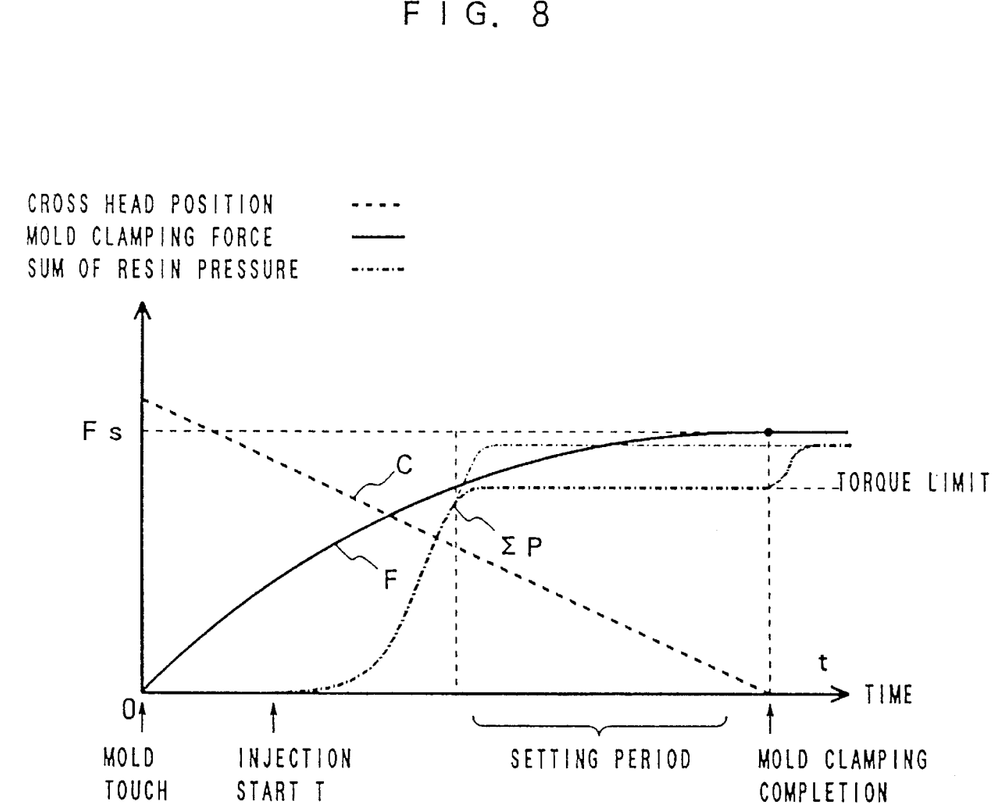
FIG. 8 is a conceptual view showing display elements on the timing setting screen in the injection molding machine according to the embodiment.

For the purpose of performing a molding cycle at a higher speed, a limitation is set to molding conditions already selected in the conditioning process. For example, both the method of executing an injection operation by setting a torque limit with respect to an injection pressure in the initial stage of injection process and the method of controlling an injection pressure by controlling an injection speed enable the injection start timing to be shifted nearer to the time point of mold touch. However, in these methods, the injection control is not executed according to molding conditions selected in the conditioning process; for this reason, there is no assurance that the conforming products can be obtained. Thus, these methods should be applied to products which will be less effected by modification of molding conditions. FIG. 8 graphically shows an example of the relationship between a mold opening force $\Sigma P$ (indicated by a fine single-dotted line) corresponding to molding conditions selected in the conditioning process, and a mold opening force $\Sigma P$ (indicated by a bold single-dotted line) forcedly lowered by setting a torque limit in the initial injection stage. More specifically, even without delaying an injection start timing or increasing a clamping speed in order to modify inappropriate conditions as shown in FIG. 5, undesired mold opening can also be prevented by controlling injection pressure in the initial injection stage. In general, if an injection speed or pressure is controlled to a low level, this frequently affects adversely on resin filling operation. However, in the injection molding control method according to the present embodiment, a mold clamping force in the initial injection stage is set to a low level, so that breathing becomes easier. Therefore, the adverse effect of setting a torque limit to a low level with respect to an injection pressure is relatively small.

As described above, in order to speed a molding cycle by carrying out partially in parallel the mold clamping and injection operations, it is necessary for the mold opening force caused by injection pressure in a mold clamping process to be controlled so as not to exceed the mold clamping force outputted at that time. For this purpose, there are the following three methods: a method of adjusting injection start timing, a method of adjusting mold clamping speed, and a method of setting molding conditions under which injection pressure in the initial injection stage will not become too high (or, a method of forcedly controlling an injection pressure in the initial injection stage by setting a torque limit). Besides, there is a method of attaining the aforementioned purpose by arbitrarily combining these methods. The method for attaining the purpose is dependent on the requirements such as those for mold structure or strength, precision of products, and a speeding of molding works; therefore, the applicability of such a method is also dependent on the requirements to be met.

Figure 4:
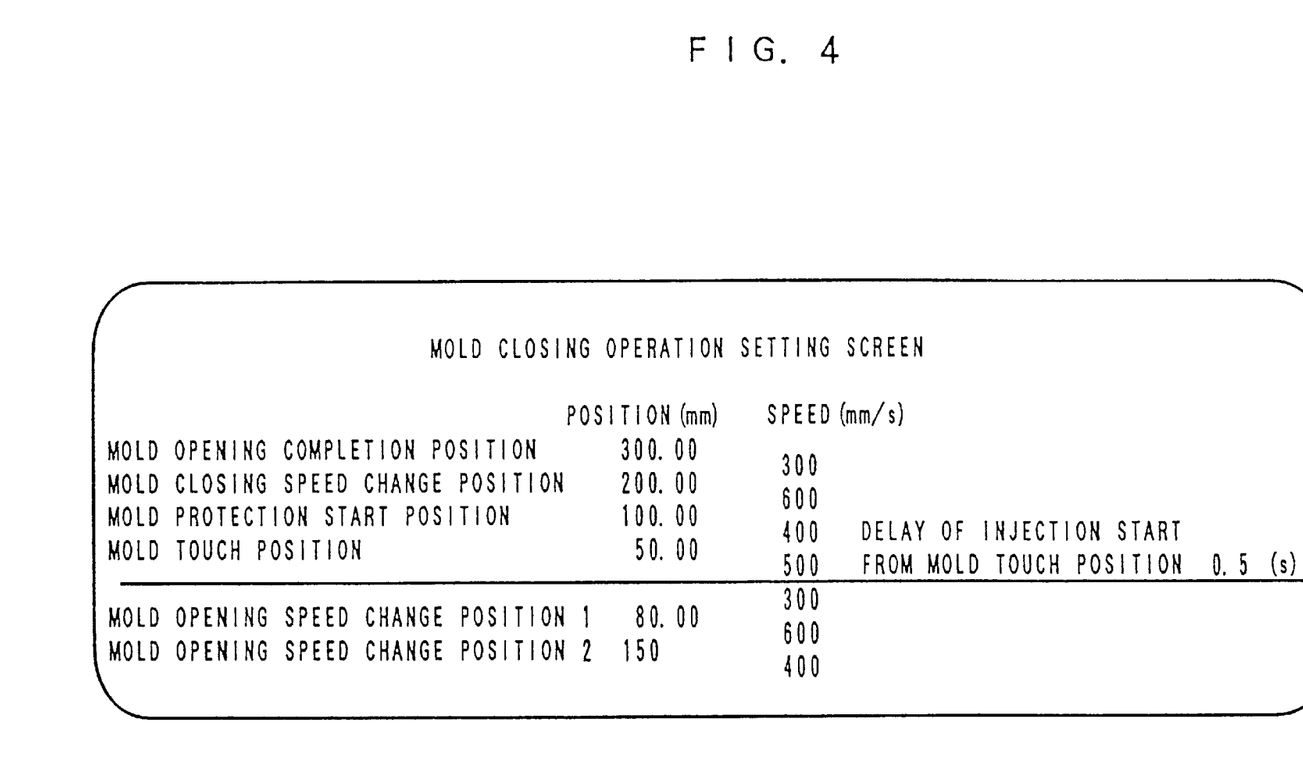
FIG. 4 is a conceptual view showing a mold operation setting screen in the injection molding machine according to the embodiment.

Based on the previously described provisional setting operation and condition confirming work, the operator determines mold clamping speed and an injection start timing. Then, the operator operates the manual data input unit 19 with a display to select a mold operation setting menu of a conversational mode on the display screen as shown in FIG. 4. Further, the operator inputs the clamping speed and injection start timing determined in the previous operation to the control unit 10, more specifically to the nonvolatile memory 26 for storage. In FIG. 4 shows an example of setting an injection start timing according to time elapsed from mold touch. However, as described previously, the mold operation setting menu can also be designed to be adaptable to the method of specifying an injection start timing on the basis of movement of the movable platen 5, a method of specifying an injection start timing on the basis of an extension of the tie bar 42, and a method of specifying an injection start timing on the basis of a mold clamping force F.

Figure 2:
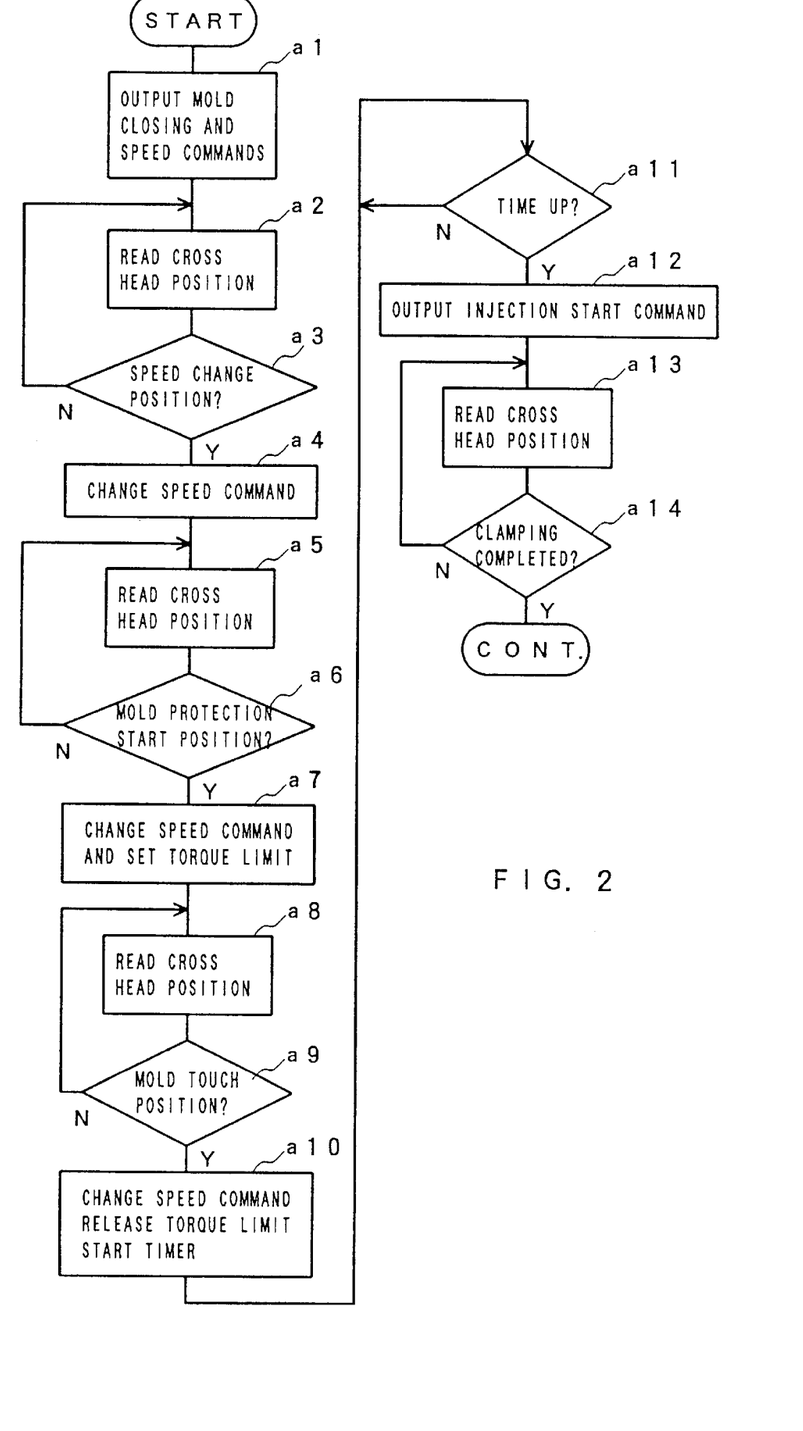
FIG. 2 is a flowchart showing an example of an injection start timing control for the injection molding machine according to the embodiment.

FIG. 2 is a flowchart showing an outline of procedures for executing partially in parallel the mold clamping and injection operations by setting an injection start timing on the basis of time elapsed from a mold touch. The operational procedures of an injection molding control method according to the present embodiment will be explained below with reference to FIG. 2. Incidentally, weighting, cooling, mold opening and product ejection processes are the same as the conventional equivalents, and so, in this flowchart, explanations of these processes are omitted.

The PMCCPU 16, after starting operational procedure for a mold clamping process, first outputs a mold closing command and a mold closing speed command based on the mold operation conditions stored in the nonvolatile memory 26 to cause the CNCCPU 17 to drive and control the clamping servo motor. (Step a1) and further causes the movable platen 5 to be moved in the mold closing direction through the ball screw mechanism and the toggle system 45.

Then, the PMCCPU 16 successively detects the cross head position C in the toggle system 45 through the current position storage register corresponding to the clamping servo motor Mc (Step a2, Step a3). The PMCCPU 16 stands by until the cross head position C reaches a mold closing speed change position stored in the nonvolatile memory 26, thereafter changes the mold closing speed command according to the mold operational conditions stored in the nonvolatile memory 26 (Step a4), and again starts detecting the cross head position C (Step a6).

If it is confirmed that the cross head position C has reached a mold protection start position stored in the nonvolatile memory 26, the PMCCPU 16 again changes the mold closing speed command according to the mold operational conditions stored in the nonvolatile memory 26, and sets a predetermined torque limit with respect to the clamping servo motor Mc to perform a mold protective operation (Step a7). Further, the PMCCPU 16 continues to successively detect the cross head position C until the cross head position C reaches a mold touch position stored in the nonvolatile memory 26 (Step a8, Step a9).

According to an example shown in FIG. 4, a mold closing speed is 300 mm/s between a mold opening completion position where the cross head position C is 300 mm and a mold closing speed change position where the cross head position C is 200 mm, a clamping speed is 600 mm/s between the mold closing speed change position and a mold protection start position where the cross head position C is 100 mm, a mold closing speed is 400 mm/s between the mold protection start position and a mold touch position where the cross head position C is 50 mm, and a mold closing (clamping) speed after that is 500 mm/s.

If the cross head position C reaches a mold touch position stored in the nonvolatile memory 26, and it is confirmed that the movable side mold 7 of the movable platen 5 abuts against the stationary mold part 8 of the front platen 6, the PMCCPU 16 converts the mold closing speed command into mold clamping speed in accordance with the mold operation conditions stored in the nonvolatile memory 26, while releasing a torque limit given to the clamping servo motor Mc to complete mold protection, and whereupon causes a timer for measuring time elapsed from a mold touch to start operation (Step a10). This point of time corresponds to state in which time is zero as in FIGS. 6 to 8.

Then, the PMCCPU 16 stands by until the time measured by timer reaches the preset injection start timing stored in the nonvolatile memory 26 (Step a11). During this period of time, the CNCCPU 17 drives and controls the clamping servo motor to cause the cross head ch to be moved toward a clamping completion position; therefore, the tie bar is gradually extended, and mold clamping force F will increase nonlinearly.

Subsequently, if it is confirmed that the timer indicates preset injection start timing, the PMCCPU 16 outputs an injection start command to the CNCCPU 17 (Step a12) so that the CNCCPU 17 drives and controls the injection servo motor Ms in accordance with the injection and hold-pressure conditions previously stored in the nonvolatile memory 26. A clamping operation by the clamping servo motor Mc and an injection operation by the injection servo motor Ms are parallelly executed according to a known axis interpolation processing.

As already described, even if clamping and injection operations are executed overlapping with each other, a clamping speed, injection start timing and injection pressure are set so that a mold opening force ΣP caused by injection will not exceed mold clamping force F; therefore, resin blow by undesired mold opening or the formation of burr can be prevented. Moreover, injection operation is started before the molds are tightly pressed against each other as the mold clamping force F increases, thereby making gas breathing easier and preventing burning of the products caused by rise of temperature due to compression of gas or air.

The PMCCPU 16 stands by until the cross head position C reaches the clamping completion position "zero", and finishes main processing concerning a mold closing process after confirming the lockup of the toggle system 45 (Step a13, Step a14). Then, the PMCCPU 16 receives an injection completion signal from the CNCCPU 17, and subsequently executes sequence control in the same manner as conventional one.

Figure 3:
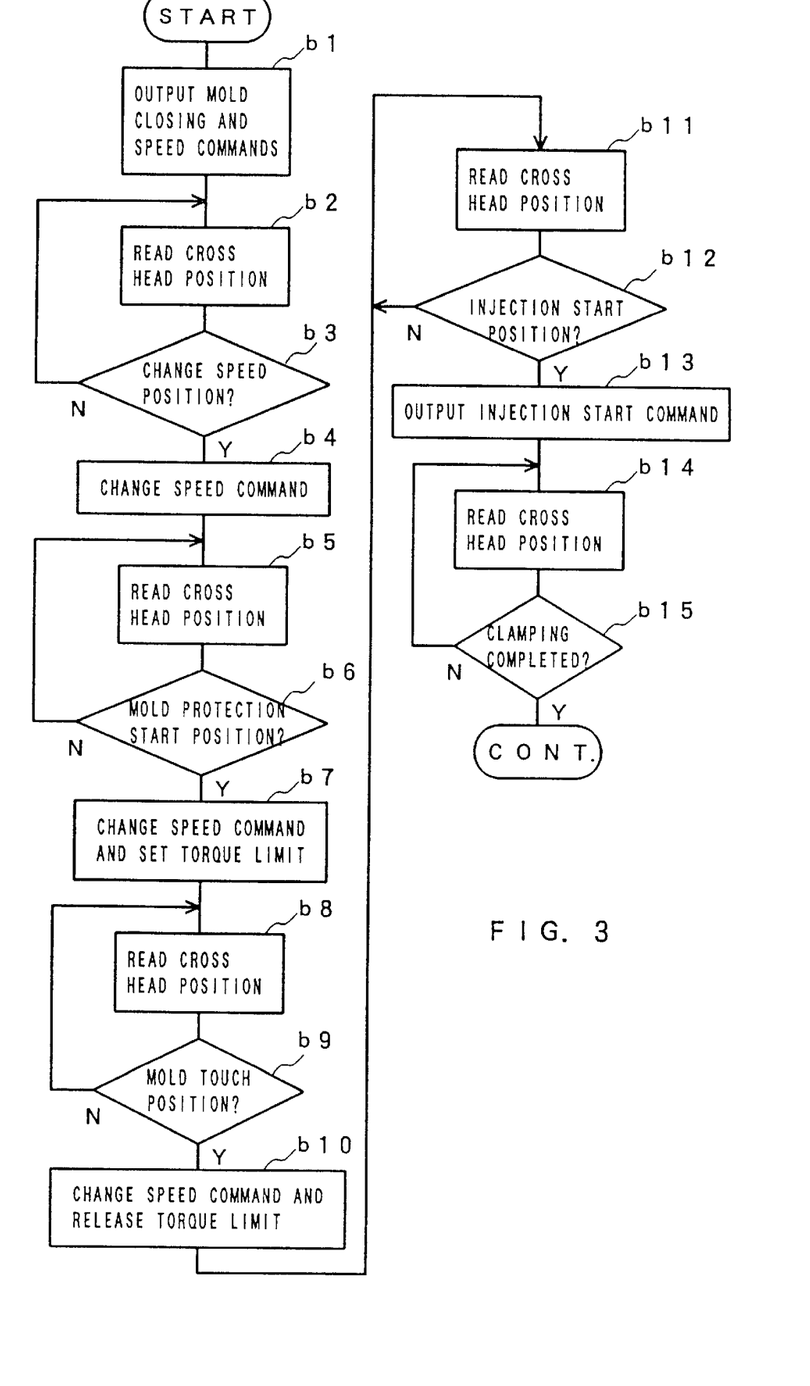
FIG. 3 is a flowchart showing an another example of the injection start timing control.

FIG. 3 is a flowchart showing an outline of procedures in the case where an injection start timing is set on the basis of the cross head position corresponding to the feed of movable platen 5, and the clamping and injection operations are executed overlapping with each other. The main parts of the flowchart shown in FIG. 3 are almost the same as the flowchart shown in FIG. 2, but differs only in that the injection start command is outputted when the current position of the cross head ch reaches the injection start position, instead of depending on time measured by the timer. In short, the injection start position in step b12 is a value of D shown in FIG. 6. In place of the processing of step b11, an extension of the tie bar 42 may be detected by means of a strain gage, and in place of the processing in step b12, it may be checked whether or not the extension reaches a value of Δ. Also, in place of the processing in step b11, a mold clamping force F may be detected by means of a load cell interposed between the movable side mold 7 and the movable platen 5 or between the toggle system 45 and the movable platen 5, and in place of the processing of step b12, it may be checked whether or not the clamping force value has reached a preset value W. Even in such a manner, control producing substantially the same effect as that described in FIG. 2 can be obtained.

The above embodiment is described by giving an example of an electric injection molding machine which employs the toggle system 45 to perform mold clamping operation. The injection timing setting method and the injection timing control method described in the present embodiment are directly applicable to a straight hydraulic mold clamping system. More particularly, in an injection molding machine having a toggle mold clamping system, function F of the change in mold clamping force is a nonlinear simple increasing function, while in an injection molding machine having a straight hydraulic mold clamping system, the function F of the change in a mold clamping force is a linear simple increasing function. Thus, the operations for setting an injection start timing and a mold clamping speed and the operations for confirming the relationship between a mold clamping force and a mold opening force are entirely the same as those described before.

We claim:

1. An injection molding control method for an injection molding machine, wherein injection of resin into a cavity is started prior to completing a mold clamping operation and the mold clamping operation and injection operation are executed with injection start timing and mold clamping speed set so that the sum of a resin pressure acting on the parting plane of a mold cavity increases with increasing mold clamping force during the period ranging from mold touch to mold clamping completion in a mold closing process.

2. The injection molding control method according to claim 1, wherein the beginning of injection of the resin into the cavity is determined on the basis of the time elapsed from initial mold touch.

3. The injection molding control method according to claim 1, wherein the beginning of injection of the resin into the cavity is determined on the basis of a position of a movable platen.

4. The injection molding control method according to claim 1, wherein the beginning of injection of the resin into the cavity is determined on the basis of mold positions on a tie bar.

5. An injection molding control method for an injection molding machine, wherein injection of resin into a cavity is started prior to completing a mold clamping operation and the mold clamping operation and injection operation are executed with injection start timing and either injection pressure or injection speed of the resin is set so that the sum of a resin pressure acting on the parting plane of a mold cavity increases with increasing mold clamping force during the period ranging from mold touch to mold clamping completion in a mold closing process.

6. The injection molding control method according to claim 5, wherein the beginning of injection of the resin into the cavity is determined on the basis of the time elapsed from initial mold touch.

7. The injection molding control method according to claim 5, wherein the beginning of injection of the resin into the cavity is determined on the basis of a position of a movable platen.

8. The injection molding control method according to claim 5, wherein the beginning of injection of the resin into the cavity is determined on the basis of mold positions on a tie bar.

9. An injection molding control method for an injection molding machine, wherein injection of resin into a cavity is started prior to completing a mold clamping operation and the mold clamping operation and injection operation are executed with injection start timing, clamping speed and either injection pressure or injection speed of the resin is set so that the sum of a resin pressure acting on the parting plane of a mold cavity increases with increasing mold clamping force during the period ranging from mold touch to mold clamping completion in a mold closing process.

10. The injection molding control method according to claim 9, wherein the beginning of injection of the resin into the cavity is determined on the basis of the time elapsed from initial mold touch.

11. The injection molding control method according to claim 9, wherein the beginning of injection of the resin into the cavity is determined on the basis of a position of a movable platen.

12. The injection molding control method according to claim 9, wherein the beginning of injection of the resin into the cavity is determined on the basis of mold positions on a tie bar.

13. An injection molding control method for an injection molding machine, comprising the steps of:

starting an injection operation prior to completing a mold clamping operation;

displaying a two-axis orthogonal coordinate having a first axis for plotting elapsed time from a mold touch and a second axis for plotting mold clamping force, on a screen of a display device connected to the injection molding machine;

displaying on the coordinates a mold clamping force curve indicating transition of mold clamping force with respect to an elapsed time from a mold touch position where a movable side mold and a stationary side mold start to abut against each other to a mold clamping completion position where a clamping toggle system is locked up, on the basis of related data designated previously by manual input;

displaying on said coordinates a mold opening force curve indicating a mold opening force, which is a resin pressure acting on the parting plane of a mold cavity, corresponding to an elapsed time from a mold touch position to a clamping completion position, calculated based on relating data detected by actually operating a injection molding machine according to preset injection conditions;

judging whether said mold opening force curve shown on said coordinates is lying all the way below said mold clamping force curve throughout the entire section between said mold touch position and said mold clamping completion position;

changing the previous injection molding conditions by taking at least one of the following means (a) through (d) if it is judged that said mold opening force curve is even partially lying above said mold clamping force curve on said coordinate;

operating injection molding machine according to the changed injection molding conditions again;

setting said changed injection molding conditions to a control device if it is confirmed that said mold opening force curve is lying below said mold clamping force curve throughout the entire section between said mold touch position and said mold clamping completion position on said coordinate; and again changing said injection molding conditions and repeating the same operation as described above if the mold opening force curve is not lying in the fashion described above, said means comprising:
(a) adjusting injection start timing with respect to molds touch;
(b) adjusting mold clamping speed;
(c) adjusting time required from the injection start to resin filling completion; and
(d) increasing resin injection pressure in the initial injection stage with increasing clamping force between the movable side mold and the stationary side mold.

14. An injection molding control method for an injection molding machine having first and second mold portions which come together and separate at a parting plane of a mold cavity, comprising the steps of:

starting resin injection while the first and second mold portions are being clamped together in a clamping operation, after the first and second mold portions make initial contact with one another;

setting at least one parameter selected from the group consisting of the time at which resin injection is started, the speed at which the first and second mold portions are clamped together, the pressure at which the resin is injected into the mold and the speed at which the resin is injected into the mold, the at least one parameter being set so that a resin pressure acting on the parting plane of the mold cavity increases with increasing clamping force between the first and second mold portions.

* * * * *

UNITED STATES PATENT AND TRADEMARK OFFICE
CERTIFICATE OF CORRECTION

PATENT NO.​ :   5,906,777
DATED       :   May 25, 1999
INVENTOR(S) :   Kamiguchi et al.

It is certified that error appears in the above-identified patent and that said Letters Patent is hereby corrected as shown below:   On the title page:

Item  [75] Inventors: delete "-gun";

Item

[56] References Cited, Col. 2, OTHER PUBLICATIONS, "599-217119" should be --59-217119--.

Col. 5,   line 27, "operations-of" should be --operations of--.

Col. 7,   line 17, "this-period" should be --this period--.

Signed and Sealed this

Ninth Day of November, 1999

Attest:

Q. TODD DICKINSON

*Attesting Officer*    *Acting Commissioner of Patents and Trademarks*